United States Patent [19]

Strammello, Jr.

[11] 4,400,735
[45] Aug. 23, 1983

[54] MULTI-COMPONENT VIDEO SYSTEM CONTROLLER

[75] Inventor: Peter Strammello, Jr., Arlington Heights, Ill.

[73] Assignee: Zenith Radio Corporation, Glenview, Ill.

[21] Appl. No.: 282,305

[22] Filed: Jul. 10, 1981

[51] Int. Cl.³ .......................................... H04N 5/22
[52] U.S. Cl. ..................................... 358/181; 358/189
[58] Field of Search ............... 358/188, 181, 189, 127, 358/86; 455/3, 133, 140, 344

[56] References Cited

U.S. PATENT DOCUMENTS

| | | | |
|---|---|---|---|
| 3,484,548 | 12/1969 | Kowal | 358/188 |
| 3,914,534 | 10/1975 | Forbes | 358/86 |
| 4,031,548 | 6/1977 | Kato | 358/188 |
| 4,151,557 | 4/1979 | Iida | 358/181 |
| 4,276,562 | 6/1981 | Stewart | 358/188 |
| 4,337,480 | 6/1982 | Bourassin | 358/93 |

Primary Examiner—Tommy P. Chin

[57] ABSTRACT

Apparatus for simultaneously controlling the operating modes of a plurality of coupled video signal processing devices is disclosed. Manually operated pushbutton selectors provide D.C. control voltages to a plurality of electronic RF switches to permit the simultaneous viewing and recording of signals from various sources such as cable TV (CATV), subscription TV decoder (STV), video record (or disc) player, etc., in any desired combination. Video signal losses due to signal splitting are avoided when viewing and recording the same input signal by means of unique cooperation between view and record manually operable selectors. Electronic diode switching circuitry controlled by a minimum number of user selectable inputs allows for a reduced number of controller components and simplified design while facilitating user operation.

10 Claims, 2 Drawing Figures

MULTI-COMPONENT VIDEO SYSTEM CONTROLLER

BACKGROUND OF THE INVENTION

This invention relates generally to electronic control systems and more specifically is directed to a controller for use in a multi-component video signal display and recording system.

The television receiver no longer stands alone as the sole member of a typical home video entertainment center. Today, in increasing numbers such video entertainment devices as video tape recorders (VTR's) and video record, or disc, players are becoming increasingly popular and available. Thus, the development of the home video entertainment center appears to be paralleling the development of the modular approach taken in the audio equipment field.

A centralized system is best implemented by means of a single controller for directing the operation of the individual components and for providing the necessary interfacing therebetween. The increasing complexity and versatility of the various available home video devices has placed demanding performance requirements upon a home video control system. For example, the rapid growth of cable television (CATV) has greatly expanded television programming available to the public. The increasing use of satellite communications and the expanding number of FCC-authorized subscription television (STV) stations promises to even further increase television programming available to the viewing public. This increase in the complexity and flexibility of currently available home video equipment and the growing number of television stations has resulted, in general, in home entertainment equipment controllers which are overly complex and difficult to operate. While a detailed (and complex) set of operating instructions generally accompany such equipment, the typical viewer has difficulty when attempting to fully grasp and master the operation of the device and hence is unable to take advantage of its full capability.

Because of the increased number of home video and television accessories, each of which has an RF-TV signal output, conventional video equipment control systems heretofore proposed have generally introduced undesirable distortion, noise or interference into the transmitted signals. For example, the front panel pushbutton selectors in these devices are generally used for mechanically switching the RF signals. These mechanical switches become noisy after extended use causing a degradation of the received video signal. In addition, the use of RF signal splitters in a conventional controller reduces the level of the television signals by as much as 8 dB. This signal loss is experienced not only during the simultaneous viewing and recording of a single signal, but also when one signal is being viewed while another is recorded.

Furthermore, conventional video equipment control systems using mechanical switching of the RF-TV signals are severely limited as to the degree of isolation between the various signal inputs and also the degree of EMI shielding which can be achieved while remaining cost effective.

U.S. Pat. No. 3,484,548 to Kowal et al. describes one approach for controlling the distribution of broadcast and recorded video information among various video signal processing devices. Described therein is a control center adapted to be connected to a video tape recorder, a conventional television receiver, and a television camera which is primarily comprised of a multi-section, rotary switch. As such, this mechanical switch directly couples the various components in the system and tends to become noisy with extended use in exhibiting the previously discussed operating limitations.

U.S. Pat. No. 4,031,548 to Kato discloses a combination of a television receiver and a VTR for recording and/or reproducing television signals wherein the television receiver has at least two signal selecting and receiving circuitries, each including a separately tuneable tuner, an intermediate frequency stage and a detecting stage. This system further includes two signal distributors, or splitters, for dividing the received television signals into two separate signals in providing the thus divided signal to the two signal selecting and receiving circuits. The signal losses inherent in such a system have been previously discussed and result from the attempt to accommodate the VTR using conventional television receiver circuitry. In addition, this system is designed for incorporation in the television receiver itself and thus relies upon the aforementioned complex and expensive conventional television receiver circuitry for its implementation therein.

In a control system where the signal inputs must be switched to two outputs rather than a single output, signal splitting is required to provide the proper signal path therebetween. Where there are a number of series switching stages in each potential signal path, groups of switches are required to perform each and every mode of operation. Conventionally in such systems, an extensive control matrix is provided for directing a particular input signal to the desired output. Of course, the more complex the switching matrix, the more tedious it is to utilize the system. The present invention, however, avoids the aforementioned problems by utilizing electronic RF switching, along with the interface capabilities of the video recording device and television receiver, controlled by a unique and novel arrangement of D.C. control switches.

OBJECTS OF THE INVENTION

Accordingly, it is an object of the present invention to provide a control system for connecting one of a plurality of signal generating devices with one or more of a plurality of signal utilizing devices.

It is another object of the present invention to provide an improved system for the simultaneous viewing and recording of received television signals.

Still another object of the present invention is to provide an improved controller for a multi-component multi-mode video signal display and recording system.

A further object of the present invention is to provide an improved system for viewing a broadcast or recorded video signal while simultaneously recording the same or another broadcast or recorded video signal.

A still further object of the present invention is to provide an improved electronic controller for use in an integrated video system including a multi-band, multi-function television receiver, a video tape recorder, a video record player, and any other conventional television signal display or recording device.

BRIEF DESCRIPTION OF THE DRAWINGS

The appended claims set forth those novel features believed characteristic of the invention. However, the invention itself as well as further objects and advantages thereof, will best be understood by reference to the following detailed description of a preferred embodiment taken in conjunction with the accompanying drawings, where like reference characters identify like elements in the several figures, in which:

DESCRIPTION OF THE PREFERRED EMBODIMENTS

Figure 1:
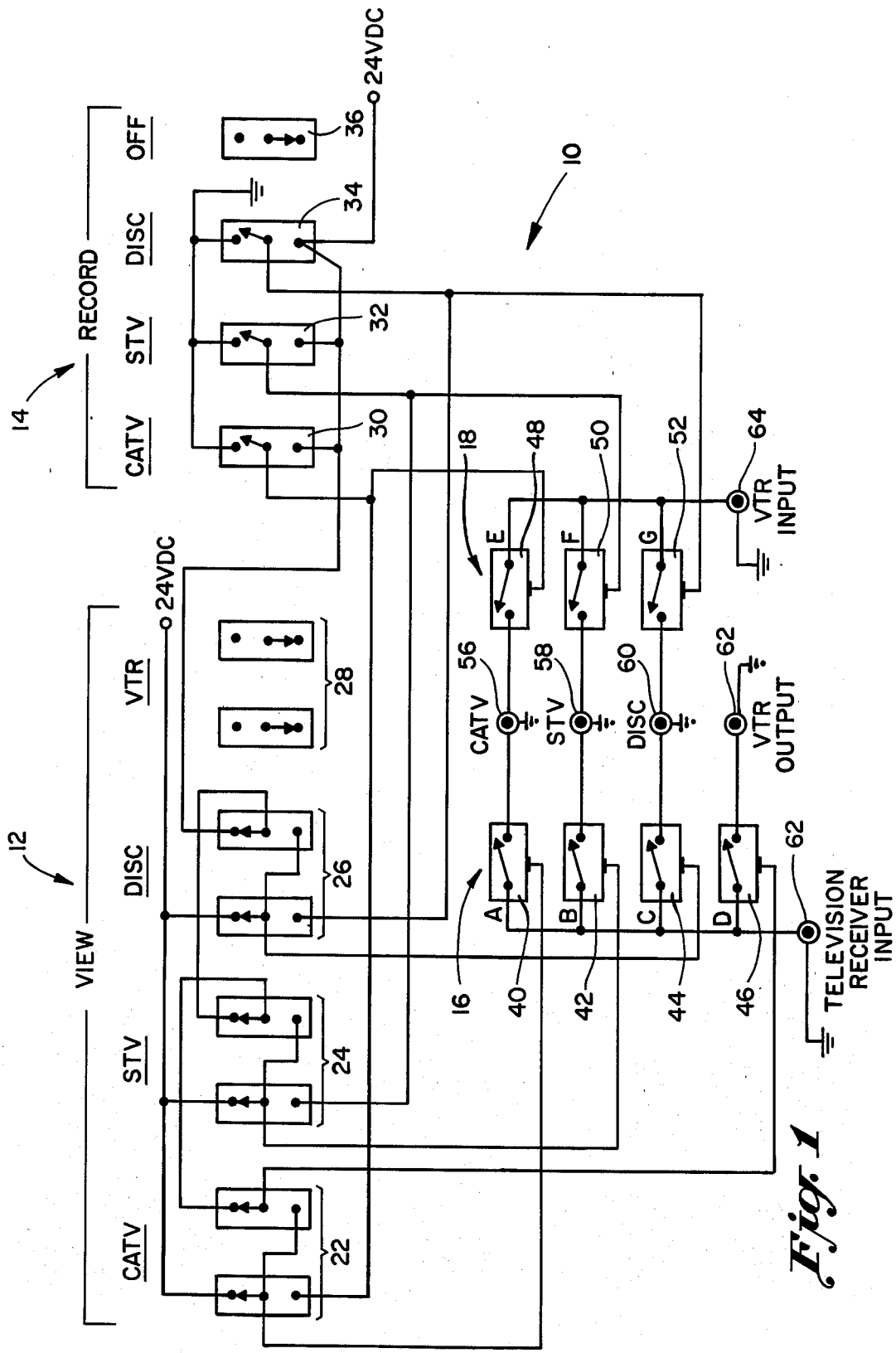
FIG. 1 is a simplified block diagram showing an embodiment of a multi-component video system controller according to the present invention.

Referring to FIG. 1, there is shown a simplified block diagram of a multi-component video system controller 10 according to the present invention. Briefly, TV-RF input signals are provided to input ports 56, 58, 60 and 62. In a preferred embodiment of the present invention, these signals are VHF-TV or CATV signals and the channel 3 or 4 RF outputs of home video accessories which are labeled STV, DISC and VTR. These signals are then provided to a view signal controller 16 and a record signal controller 18. The view, or display, signal controller 16 determines which input signal is to be displayed on the television receiver. The record signal controller 18 determines which input signal is to be recorded on the video tape recorder (VTR). A first bank of user selectable controls on viewer control panel 12 provides D.C. voltages to view signal controller 16 while a second array of user selectable controls on a record control panel 14 provide D.C. voltages to record signal controller 18. It is by means of these user provided D.C. control voltages that video system controller 10 selectively provides the desired signal to the television receiver for display thereon while simultaneously providing the same or another signal to the VTR for recording thereon.

More particularly, the record control panel 14 is comprised of four user selectable controls. These controls include a CATV record selector 30, an STV record selector 32, a video disc record selector 34, and an OFF selector 36 These selectors are of the pop-out type wherein the selection of a given control element on record control panel 14 automatically results in the de-selection of all other control elements thereon. Thus, while OFF selector 36 is not electrically coupled to another element in video system controller 10, its selection will result in the automatic de-selection of all other selectors on record control panel 14. In a preferred embodiment of the present invention, each of the record selectors on record control panel 14 is a single-pole, double-throw (SPDT) mechanical switch. One contact, or terminal, of each of the selectors on record control panel 14 is coupled to neutral ground potential, while the other contact is coupled to a DC voltage source.

View control panel 12 is comprised of four user selectable controls which, in combination, determine which input signal is displayed on the television receiver. A CATV view selector 22, an STV view selector 24, a video record, or disc, selector 26, and a video tape recorder selector 28 are included in view control panel 12. In a preferred embodiment of the present invention, each of the user operated selectors on view control panel 12 is a double-pole, double-throw (DPDT) mechanical switch. CATV view selector 22, STV view selector 24, and video disc view selector 26 are comprised of a pair of cross-wired SPDT mechanical switches. As in the case of the record selectors on record control panel 14, the view selectors of view control panel 12 are of the pushbutton/pop-out type so that the selection of a particular source of signals for display on the television receiver automatically results in the deselection of all other view signal sources. Each of the CATV, STV, and video disc record selectors 30, 32 and 34 has one terminal connected to neutral ground potential, another terminal connected to a 24 VDC source, and the third, or center, terminal connected to record signal controller 18 and to respective control elements of view control panel 12. Thus, the center terminal of CATV record selector 30 is coupled to CATV view selector 22. Similarly, STV record selector 32 and video disc record selector 34 are coupled to STV view selector 24 and video disc view selector 26, respectively. By thus coupling the record control selectors to respective view control selectors, an input signal to be viewed and recorded is not actually delivered simultaneously to both the television receiver and video tape recorder, as the TV receiver is immediately switched to the output of the VTR. This avoids the signal degradation experienced in prior art video system controllers. The manner in which this is accomplished will now be explained in detail.

Referring to FIG. 1, user selection of any of the selector elements on record control panel 14 is indicated by the movable element of the selector pointing in a downward direction. Similarly, in referring to the configuration of the selectors on view control panel 12, the downward orientation of both movable elements indicates the engagement of that selector element. If a selector element is not engaged its movable element, or elements, is oriented in an upward direction in FIG. 1. Thus, it can be seen that if none of the record selectors on record control panel 14 are engaged, all selectors thereon will be maintained at neutral ground potential. However, if either CATV, STV, or video disc record selectors 30, 32 and 34, is selected, a 24 VDC input will be provided to the corresponding control element of record signal controller 18 and the corresponding view selector on view control panel 12. In addition, 24 VDC is applied to video disc view selector 26 through CATV, STV and video disc record selectors 30, 32 and 34.

With these general operating characteristics of video system controller 10 in mind, its operation will now be described in terms of several combinations of view and record selector engagement. One example involves the engagement of corresponding selectors on view and record control panels 12 and 14. The second example involves the selection of different respective controls on each of these control panels. From a detailed discussion of the operation of video system controller 10 under each of these operating conditions, a complete understanding of the organization and operation of video system controller 10 can be realized.

Consider first the engagement of CATV view selector 22 and CATV record selector 30. The selection of CATV record selector 30 provides 24 DVC to video disc view selector 26, CATV view selector 22 and CATV record control 48. Thus, with CATV view selector 22 selected and both switch elements thereof in a downward orientation, the 24 VDC provided to CATV view selector 22 from record control panel 14 will be applied to VTR view control 46.

TABLE I

| VIEW | RECORD | \multicolumn{7}{c}{VOLTAGE APPLIED TO CONTROL ELEMENTS} |

| VIEW | RECORD | 40 | 42 | 44 | 46 | 48 | 50 | 52 |
|------|--------|----|----|----|----|----|----|----|
| CATV | CATV | 24 | 24 | 24 | 24 | 24 | 0 | 0 |
| CATV | STV | 0 | 24 | 24 | 0 | 0 | 24 | 0 |
| CATV | DISC | 0 | 24 | 24 | 0 | 0 | 0 | 24 |
| STV | CATV | 24 | 0 | 24 | 0 | 24 | 0 | 0 |
| STV | STV | 24 | 24 | 24 | 24 | 0 | 24 | 0 |
| STV | DISC | 24 | 0 | 24 | 0 | 0 | 0 | 24 |
| DISC | CATV | 24 | 24 | 0 | 0 | 24 | 0 | 0 |
| DISC | STV | 24 | 24 | 0 | 0 | 0 | 24 | 0 |
| DISC | DISC | 24 | 24 | 24 | 24 | 0 | 0 | 24 |
| CATV | OFF | 0 | 24 | 24 | 0 | 0 | 0 | 0 |
| STV | OFF | 24 | 0 | 24 | 0 | 0 | 0 | 0 |
| DISC | OFF | 24 | 24 | 0 | 0 | 0 | 0 | 0 |
| VCR | OFF | 24 | 24 | 24 | 24 | 0 | 0 | 0 |

TABLE II

| CONTROL ELEMENT | To OPEN | To CLOSE |
|-----------------|---------|----------|
| 40 | 24 v | 0 v |
| 42 | 24 v | 0 v |
| 44 | 24 v | 0 v |
| 46 | 0 v | 24 v |
| 48 | 0 v | 24 v |
| 50 | 0 v | 24 v |
| 52 | 0 v | 24 v |

In addition, 24 VDC is applied to CATV record control 48 directly from CATV record selector 30 and 24 VDC is provided to CATV view control 40 by means of CATV view selector 22 and the 24 VDC source to which it is connected. In addition, since the same 24 VDC source is coupled to STV and video disc view selectors 24 and 26, 24 VDC is provided to STV and video disc view controls 42 and 44 of display signal controller 16. With neither STV nor video disc record selectors 32 and 34 engaged, 0 VDC is applied to STV and video disc record controls 50 and 52. Thus, with CATV view selector 22 and CATV record selector 30 engaged, 24 VDC is applied across CATV 40, STV 42, video disc 44 and VTR 46 view controls. In addition, 24 VDC is applied across CATV record control 48. This selective application of control voltages to various elements in view and record controllers 16 and 18 is shown in the first row of Table I. Conducting characteristics of the various control elements in view and record controllers 16 and 18 with control voltages of 0 or 24 VDC applied thereto are shown in Table II. By applying the truth table of Table I to individual element operating characteristics shown in Table II, it can be seen that with CATV view selector 22 and CATV record selector 30 engaged, CATV record control 48 and VTR view control 46 will be rendered conducting. Thus, the CATV signal is provided to the VTR via CATV record control 48 for recording therein and the output of the VTR is provided to the television receiver for display thereon by means of VTR view control 46. The received CATV signal is thus provided to the television receiver through the video tape recorder and is not provided directly thereto through CATV view control 40. The CATV signal is thus not split in the simultaneous viewing and recording thereof.

The second operating example to be described involves the selection of STV view selector 24 and video disc record selector 34. The engagement of video disc record selector 34 will result in the application of 24 VDC to video disc view selector 26 and video disc record control 52. Thus, video disc record control 52 is the only element in record signal controller 18 to which 24 VDC is applied. With STV view selector 24 engaged, 24 VDC will be applied to CATV view control 40 and video disc view control 44 in display controller 16. This situation is presented in the STV view/DISC record row of Table I. Referring now to Table II for the operating characteristics of the various elements in view and record controllers 16 and 18, it can be seen that only STV view control 42 and video disc record control 52 be engaged when STV view selector 24 and video disc record selector 34 are engaged. Thus, the STV input signal is provided entirely and only to the television receiver for viewing thereon while the video disc input signal is provided entirely and only to the video tape recorder for reproduction thereon.

Figure 2:
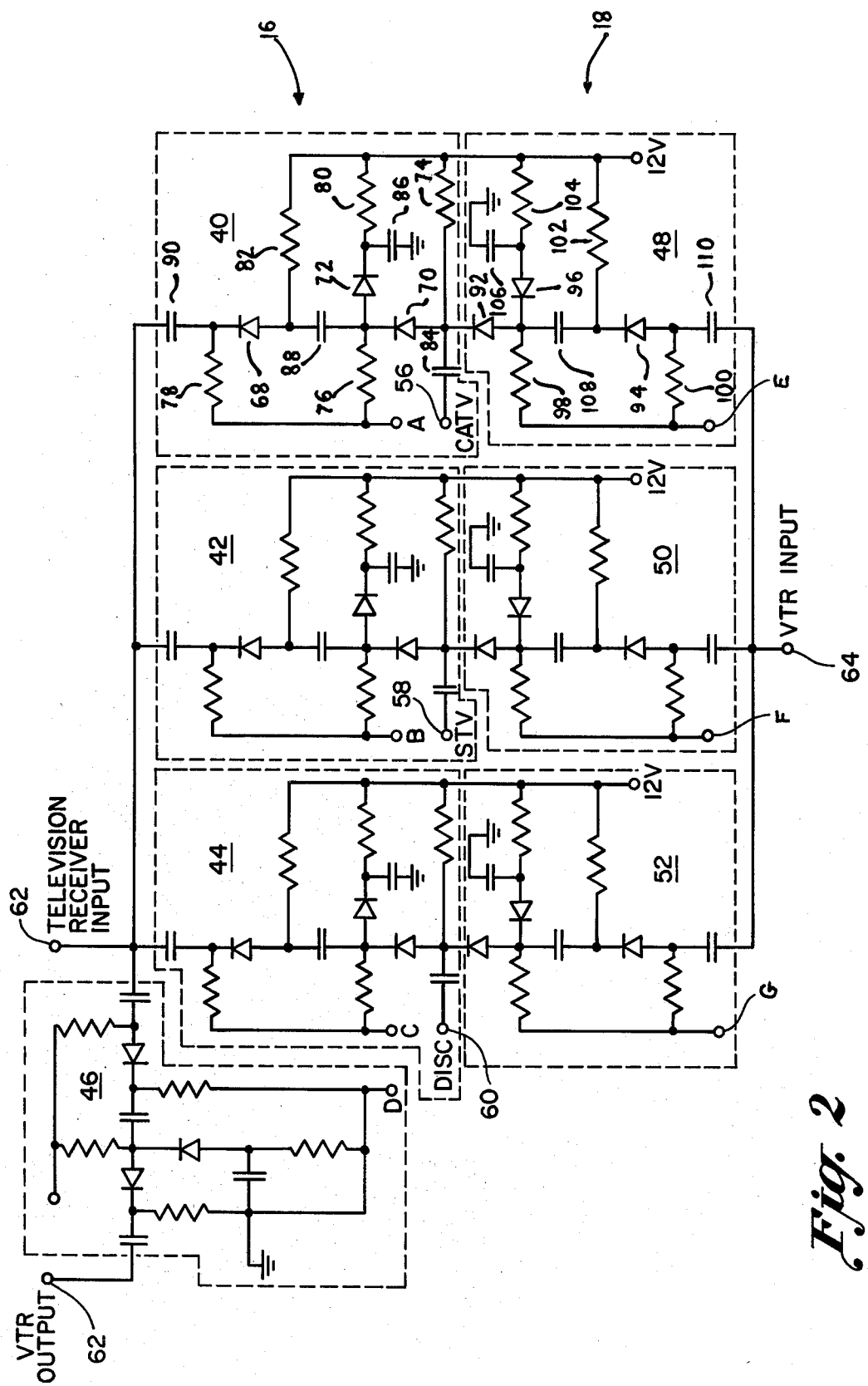
FIG. 2 is a detailed circuit diagram of the diode switching utilized in a preferred embodiment of the present invention.

Shown in FIG. 2 is a schematic diagram of a preferred embodiment of display signal controller 16 and record signal controller 18. Each element therein is comprised of an electronic diode switching assembly to which is applied a constant 12 VDC reference bias voltage. Also selectively applied to each element of display and record controllers 16 and 18 is either a 0 VDC or 24 VDC control voltage under the control of the view and record selectors as previously described. The control voltage (0 to 24 VDC) is selectively applied at point A to CATV view control 40, at point B to STV view control 42, at point C to video disc view control 44, at point D to VTR view control 46, at point E to CATV record control 48, at point F to STV record control 50, and at point G to video disc record control. The points A through G shown in FIG. 2 correspond to the similarly identified points in FIG. 1. Also as shown in FIG. 1, in FIG. 2 the CATV, STV, video disc, and VTR outputs are provided respectively to input terminals 56, 58, 60 and 62. The input to the television receiver is provided at terminal 62 while the input to the VTR is provided at terminal 64.

In describing the operation of display signal controller 16 and record signal controller 18, only the operation of CATV view control 40 and CATV record control 48 circuits will be discussed since the corresponding controls for STV and video disc systems are identically configured and operate similarly. The CATV signal is provided to input port 56 for transmission to either television receiver input port 62 or VTR input port 64, as determined by the magnitude of the D.C. control voltage applied to either point A or point E. If 24 VDC is provided to point A, CATV view control 40 is rendered non-conducting and the received CATV signal is not displayed on the television receiver. If 24 VDC is applied to point E, CATV record control 48 is rendered conducting and the received CATV signal is provided to the VTR.

If point A is maintained at neutral ground potential, diode 70 is forward biased and rendered conducting by the 12 VDC reference voltage. At the same time, diode 72 is reverse biased and non-conducting. Similarly, with 12 VDC applied to the anode of diode 68, diode 68 is forward biased and conducting such that the CATV input provided to port 56 is directly transmitted via diodes 70 and 68 to television receiver port 62. If 24 VDC is applied to point A, diode 70 and diode 68 are now reverse biased while diode 72 is forward biased. Thus, the CATV input port 56 is decoupled from output port 62 while RF isolation between ports is enhanced by means of diode 72 and capacitor 86. Thus, a control voltage of 24 VDC applied to point A results in the "opening" of electronic switch 40, while 0 VDC applied thereto results in the "closing" of electronic switch 40. Resistors 74, 76, 78, 80 and 82 in CATV view control 40 circuit serve a current-limiting function to protect the switching diodes therein. Similarly, capacitors 84, 86, 88 and 90 serve a DC blocking function while allowing the transmission of AC signals thereacross.

Referring to CATV record control 48, if 24 VDC is applied to point E, diodes 92 and 94 are forward biased while diode 96 is reverse biased, and the CATV signal input is transmitted to VTR port 64 for recording on the VTR. However, if point E is maintained at neutral ground potential, while diodes 92 and 94 are reverse biased, diode 96 is forward biased and the CATV input signal is de-coupled from output port 64. Resistors 98, 100, 102 and 104 are incorporated in CATV record control 48 for current-limiting purposes in protecting the switching diodes therein. Similarly, capacitors 106, 108 and 110 serve the purposes of DC blocking. Thus, if a 24 VDC input is applied to point E, the CATV input signal is transmitted by the switching network of CATV record control 48 to VTR input port 64. If point E is maintained at neutral ground potential, the CATV input signal is de-coupled from and not provided to the VTR. Thus, it can be seen that the corresponding elements of view signal controller 16 and record signal controller 18 are rendered in opposite conducting states when the same DC voltage is applied thereto. In this manner, the view selectors 12 and record selectors 14 can be inter-wired to perform the necessary logic for the D.C. control voltages so that an input signal is never actually delivered simultaneously to both the television receiver and the VTR when corresponding selectors are engaged. In addition, if can be seen that VTR signal view control 46 has the same conducting states as those controlled by record signal controller 18. In like manner, the television receiver is automatically and immediately switched to view the output of the VTR. This internal decision making, or logic, permits the user to chooose or select a view function and a record function without referring to a matrix chart for possible conflicts.

There has thus been described a controller for a multi-component video display and recording system for simultaneously controlling the operating modes of the various components therein. Signal splitting and other sources of video signal degradation are avoided by means of control logic to automatically switch the TV receiver to the VTR output when a signal input is both viewed and recorded. While the present invention has been described in terms of controlling, in combination, a television receiver, a video disc player, and a video tape recorder, it can be seen that the present system has application for controlling more than one each of the various components in such a system. Similarly, additional video components, such as a video game or a camera, could easily be integrated in and controlled by the present invention by merely increasing the number of control elements in the view signal controller 16 and record signal controller 18 and providing appropriate input control voltages thereto. Similarly, the DC levels of the control inputs described herein are entirely up to the system designer and the present invention is not limited to such values.

While particular embodiments of the present invention have been shown and described, it will be apparent to those skilled in the art that changes and modifications may be made therein without departing from the invention in its broader aspects. The aim of the appended claims, therfore, is to cover all such changes and modifications as fall within the true spirit and scope of the invention.

I claim:

1. In a system having a single television receiver capable of receiving transmitted video signals in a plurality of broadcast bands, a source of external video signals and a video signal recorder for recording video signals thereon, a controller for the selective display on said television receiver of said transmitted, external or recorded video signals and the selective recording on said video signal recorder of said transmitted, or external video signals, said controller comprising:

a first plurality of user selectable control means for providing first control signals for the selective display on said television receiver of said transmitted, external or recorded video signals;

a second plurality of user selectable control means for providing second control signals for the selective recording on said video signal recorder of said transmitted or external video signals;

a plurality of input terminals for receiving said transmitted, external and recorded video signals;

a plurality of output terminals for providing said transmitted, external or recorded video signals to said television receiver for display thereon and for providing said transmitted or external video signals to said video recorder for recording thereon; and a plurality of first logic conducting means coupling each input terminal to an output terminal connected to said television receiver and a plurality of second logic conducting means coupling each input terminal to an output terminal connected to said video signal recorder, with said first logic conducting means coupled to and responsive to signals received from said first plurality of user selectable control means and said second logic conducting means coupled to and responsive to signals received from said second plurality of user selectable control means such that corresponding first and second logic conducting means coupled to the same input terminal are rendered in opposite conducting states by means of said first and second control signals when the video signals provided to said input terminal are displayed on said television receiver or recorded on said video signal recorder in eliminating video signal losses due to signal splitting.

2. The controller of claim 1 wherein said first and second logic conducting means comprise a plurality of electronic control devices responsive to said first and second control signals, each of said electronic control devices coupling said first and second user selectable control means with respective coupled input and output terminals.

3. The controller of claim 2 wherein said electronic control devices comprise a diode switching circuit biased by a direct voltage source and responsive to said first and second control signals from said user seleçtable control means in providing said video signals to said television receiver and said signal recorder.

4. The controller of claim 1 wherein said first logic conducting means coupling said video signal recorder to said television receiver is rendered conducting when corresponding control means are selected in said first and second pluralities of user selectable control means such that a video signal simultaneously displayed and recorded is provided to said television receiver by said video signal recorder for display thereon.

5. The controller of claim 4 wherein each of said first plurality of user selectable control means comprises a double-pole, double-throw switch and each of said second plurality of user selectable control means comprises a single-pole, double-throw switch, with the output from one of said single-pole, double-throw switches provided to a respective one of said double-pole, double-throw switches in effecting opposite conducting states in respective electronic control devices.

6. The controller of claim 1 wherein each of said first and second pluralities of user selectable control means comprises a two position mechanical switch and wherein selection of one switch in one of said first and second pluralities of user selectable control means automatically de-selects the other switches within said one control means.

7. The controller of claim 1 wherein said source of external video signals includes a video record player and a video game and said transmitted signals include cable television and subscription television signals.

8. In a system having a single television receiver capable of receiving transmitted video signals in a plurality of broadcast bands, a source of external video signals and a video signal recorder for recording video signals thereon, a controller for the selective display on said television receiver of said transmitted, external or recorded video signals and the selective recording on said video signal recorder of said transmitted or external video signals, said controller comprising:

a first plurality of user selectable control means for providing first control signals for the selective display on said television receiver of said transmitted, external or recorded video signals;

a second plurality of user selectable control means for providing second control signals for the selective recording on said video signal recorder of said transmitted or external video signals;

a plurality of input terminals for receiving said transmitted, external and recorded video signals;

a plurality of output terminals for providing said transmitted, external or recorded video signals to said television receiver for display thereon and for providing said transmitted or external video signals to said video recorder for recording thereon; and a first logic circuit coupling each input terminal to said first plurality of user selectable control means and to an output terminal connected to said television receiver and responsive to said first control signals received from said first plurality of user selectable control means and a second logic circuit coupling each input terminal to said second plurality of user selectable control means and to an output terminal connected to said video signal recorder and responsive to said second control signals received from said second plurality of user selectable control means, wherein said first and second logic circuits include respective portions coupled to the same input terminal and wherein said respective portions of said first and second logic circuits are rendered in opposite conducting states when said video signals provided to said input terminal are displayed on said television receiver or recorded on said video signal recorder, and wherein a portion of said first logic circuit coupling the video signal recorder input terminal to said television receiver is rendered conducting when corresponding control means are selected in said first and second pluralities of user selectable control means such that a video signal simultaneously displayed and recorded is provided to said television receiver by said video signal recorder for display thereon in eliminating video signal losses due to signal splitting.

9. In a system having a single television receiver capable of receiving transmitted video signals in a plurality of broadcast bands, a source of external video signals and a video signal recorder for recording video signals thereon, a controller for the selective display on said television receiver of said transmitted, external or recorded video signals and the selective recording on said video signal recorder of said transmitted or external video signals, said controller comprising:

a first plurality of two position mechanical switches for providing first control signals for the selective display on said television receiver of said transmitted, external or recorded video signals;

a second plurality of two position mechanical switches for providing second control signals for the selective recording on said video signal recorder of said transmitted or external video signals wherein the selection of one switch in one of said first and second pluralities of switches automatically de-selects the other switches in said one plurality of switches;

a plurality of input terminals for receiving said transmitted, external and recorded video signals;

a plurality of output terminals for providing said transmitted, external or recorded video signals to said television receiver for display thereon and for providing said transmitted or external video signals to said video recorder for recording thereon; and first and second pluralities of electronic control devices coupled respectively to said first and second pluralities of mechanical switches for connecting each input terminal to an output terminal connected to said television receiver and to an output terminal connected to said video signal recorder, respectively, in response to control signals received from said first and second plurality of mechanical switches, wherein corresponding first and second electronic control devices coupled to the same input terminal are rendered in opposite conducting states by means of said control signals when the video signals provided to said input terminal are displayed on said television receiver or recorded on said video signal recorder, with the one of said first plurality of electronic control devices coupling said video signal recorder to said television receiver rendered conducting when corresponding switches are selected in said first and second pluralities of mechanical switches such that a video signal simultaneously displayed and recorded is provided to said television receiver by said video signal recorder for display thereon in eliminating video signal losses due to signal splitting.

10. A system for selectively providing a first video signal or first and second video signals respectively to a television receiver and a video signal recorder, said system comprising:

a plurality of input terminals for receiving said video signals;

first and second output terminals respectively coupled to said television receiver and to said signal recorder;
user selectable control means for generating control signals;
logic means coupled to said control means and responsive to said control signals; and
first and second pluralities of conductive elements wherein each of said first plurality of conductive elements couples an input terminal to said first output terminal and each of said second plurality of conductive elements couples an input terminal to said second output terminal with each of said conductive elements operatively coupled to said logic means and wherein respective conductive elements connected to the same input terminal to which said video signals are provided are rendered in opposite conducting states in response to said control signals and wherein one of said first plurality of conductive elements couples said signal recorder to said television receiver for providing a video signal thereto for the simultaneous recording and display thereof in eliminating video signal losses due to signal splitting.

* * * * *